(12) United States Patent
Mitchell

(10) Patent No.: US 9,998,818 B1
(45) Date of Patent: Jun. 12, 2018

(54) VEHICLE ENTERTAINMENT SYSTEM

(71) Applicant: VOXX INTERNATIONAL CORPORATION, Hauppauge, NY (US)

(72) Inventor: Ciaran Mitchell, Byfleet Surrey (GB)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days. days.

(21) Appl. No.: 15/594,352

(22) Filed: May 12, 2017

(51) Int. Cl.
*H04R 1/10* (2006.01)

(52) U.S. Cl.
CPC .......... *H04R 1/1091* (2013.01); *H04R 1/105* (2013.01); *H04R 1/1008* (2013.01); *H04R 1/1025* (2013.01); *H04R 2420/07* (2013.01); *H04R 2499/13* (2013.01)

(58) Field of Classification Search
CPC ....................................................... H04R 1/10
See application file for complete search history.

(56) References Cited

U.S. PATENT DOCUMENTS

| 7,643,645 | B2 * | 1/2010 | Richards ............... H04R 5/023 381/374 |
| 9,452,718 | B1 * | 9/2016 | Dry ........................ B60R 21/055 |
| 2006/0001307 | A1 * | 1/2006 | Embach ............... B60N 2/4876 297/391 |
| 2008/0157574 | A1 * | 7/2008 | LaRussa .............. B60N 2/4876 297/217.3 |
| 2011/0002478 | A1 |   1/2011 | Pollard et al. |
| 2011/0215122 | A1 * | 9/2011 | Osborne .................. B60R 7/04 224/275 |
| 2012/0140973 | A1 |   6/2012 | Olodort et al. |
| 2015/0297003 | A1 * | 10/2015 | Ahroon ..................... G06T 7/11 206/38 |

OTHER PUBLICATIONS

Office Action dated Nov. 13, 2017 for U.S. Appl. No. 15/720,842.

* cited by examiner

*Primary Examiner* — Olisa Anwah
(74) *Attorney, Agent, or Firm* — F. Chau & Associates, LLC

(57) ABSTRACT

A vehicle entertainment system includes a headphones device and a vehicle headrest. The headphones device includes a first speaker disposed in a first speaker housing, a second speaker disposed in a second speaker housing, and a headband connecting the first speaker housing to the second speaker housing. The vehicle headrest includes a recessed channel shaped and dimensioned to receive the headband, the first speaker housing, and the second speaker housing.

20 Claims, 12 Drawing Sheets

VEHICLE ENTERTAINMENT SYSTEM

BACKGROUND

1. Technical Field

Exemplary embodiments of the present invention relate to a vehicle entertainment system, and more particularly, to a vehicle entertainment system including a headphones device and a vehicle headrest in which the headphones device can be docked.

2. Discussion of Related Art

As society becomes more mobile and therefore spends a greater amount of time traveling and away from home, demand rises for electronic devices outside the home environment. For example, vehicle entertainment units including video screens have been mounted in vehicle headrests, facilitating video entertainment on the road.

Wireless headphone devices are frequently utilized with vehicle entertainment systems so that a passenger using a vehicle entertainment system in a vehicle does not distract other passengers in the vehicle that are not using the vehicle entertainment system, and so that multiple passengers can utilize different vehicle entertainment systems outputting different audio streams within the same vehicle.

SUMMARY

According to an exemplary embodiment of the present invention, a vehicle entertainment system includes a headphones device and a vehicle headrest. The headphones device includes a first speaker disposed in a first speaker housing, a second speaker disposed in a second speaker housing, and a headband connecting the first speaker housing to the second speaker housing. The vehicle headrest includes a main body portion having a first side surface, a second side surface, and an upper surface extending from a first end of the first side surface to a first end of the second side surface. The vehicle headrest further includes a recessed channel disposed in the upper surface, the first side surface, and the second side surface of the main body portion. The recessed channel is shaped and dimensioned to receive the headband of the headphones device. The vehicle headrest further includes a first recessed headphone indentation disposed in the first side surface of the main body portion. The first recessed headphone indentation is shaped and dimensioned to receive the first speaker housing. The vehicle headrest further includes a second recessed headphone indentation disposed in the second side of the main body portion. The second recessed headphone indentation is shaped and dimensioned to receive the second speaker housing.

In an exemplary embodiment, the display is disposed on a rear surface of the main body portion.

In an exemplary embodiment, a thickness of the headband of the headphones device is about equal to a depth of the recessed channel of the vehicle headrest, a thickness of the first speaker housing is about equal to a depth of the first recessed headphone indentation of the vehicle headrest, and a thickness of the second speaker housing is about equal to a depth of the second recessed headphone indentation of the vehicle headrest.

In an exemplary embodiment, an outer surface of the headband is substantially flush with an outer surface of the main body portion while the headband is inserted into the recessed channel, wherein an outer surface of the first speaker housing is substantially flush with the outer surface of the main body portion while the first speaker housing is inserted into the first recessed headphone indentation, and an outer surface of the second speaker housing is substantially flush with the outer surface of the main body portion while the second speaker housing is inserted into the second recessed headphone indentation.

In an exemplary embodiment, the headband includes an upper portion, a first side portion having a first end connected to a first end of the upper portion and a second end connected to the first speaker housing, and a second side portion having a first end connected to a second end of the upper portion and a second end connected to the second speaker housing.

In an exemplary embodiment, the headband includes a first hinge connecting the upper portion and the first side portion of the headband, and a second hinge connecting the upper portion and the second side portion of the headband. The first side portion of the headband is configured to fold inward toward the upper portion of the headband and outward away from the upper portion of the headband via the first hinge, and the second side portion of the headband is configured to fold inward toward the upper portion of the headband and outward away from the upper portion of the headband via the second hinge.

In an exemplary embodiment, a length of the upper portion of the headband is adjustable.

In an exemplary embodiment, the recessed channel includes a first channel portion disposed in the upper surface of the main body portion, a second channel portion disposed in the first side surface of the main body portion, and a third channel portion disposed in the second side surface of the main body portion. The first channel portion, the second channel portion, and the third channel portion are connected to one another.

In an exemplary embodiment, a length of the first channel portion is about equal to a length of the upper portion of the headband while the upper portion is adjusted to be in a docking position, a width of the first channel portion is about equal to a width of the upper portion of the headband, and a depth of the first channel portion is about equal to a thickness of the upper portion of the headband. Further, a length of the second channel portion is about equal to a length of the first side portion of the headband, a width of the second channel portion is about equal to a width of the first side portion of the headband, and a depth of the second channel portion is about equal to a thickness of the first side portion of the headband. Further, a length of the third channel portion is about equal to a length of the second side portion of the headband, a width of the third channel portion is about equal to a width of the second side portion of the headband, and a depth of the third channel portion is about equal to a thickness of the second side portion of the headband.

In an exemplary embodiment, a periphery of the first recessed headphone indentation is about equal to a periphery of the first speaker housing, and a depth of the first recessed headphone indentation is about equal to a thickness of the first speaker housing. Further, a periphery of the second recessed headphone indentation is about equal to a periphery of the second speaker housing, and a depth of the second recessed headphone indentation is about equal to a thickness of the second speaker housing.

In an exemplary embodiment, the vehicle headrest is configured to electrically connect to a power source of a vehicle, and the vehicle headrest further includes first electrical contacts disposed in the first recessed headphone indentation. In addition, the headphones device further includes an internal battery and second electrical contacts disposed on the first speaker housing. The first electrical contacts make contact with and electrically connect to the second electrical contacts while the first speaker housing is inserted into the first recessed headphone indentation, and the internal battery is charged via the vehicle headrest in response to the first electrical contacts electrically connecting to the second electrical contacts.

In an exemplary embodiment, the vehicle headrest is configured to electrically connect to a power source of a vehicle, and the vehicle headrest further includes an inductive transmitter charging coil disposed in the main body. In addition, the headphones device further includes an internal battery and an inductive receiver charging coil. The internal battery is wirelessly charged via the inductive transmitter charging coil and the inductive receiver charging coil in response to the headphones device being inserted into the recessed channel, the first recessed headphone indentation, and the second recessed headphone indentation of the vehicle headrest.

In an exemplary embodiment, the inductive transmitter charging coil is disposed within the main body in an area corresponding to the first recessed headphone indentation, and the inductive receiver charging coil is disposed within the first speaker housing.

In an exemplary embodiment, the internal battery is wirelessly charged via the inductive transmitter charging coil and the inductive receiver charging coil using a QI standard or a POWER MATTERS ALLIANCE (PMA) standard.

According to an exemplary embodiment of the present invention, a vehicle entertainment system includes a vehicle headrest. The vehicle headrest includes a main body portion having a first side surface, a second side surface, and an upper surface extending from a first end of the first side surface to a first end of the second side surface. The vehicle headrest further includes a recessed channel disposed in the upper surface, the first side surface, and the second side surface of the main body portion. The recessed channel is shaped and dimensioned to receive a headband of a headphones device. The vehicle headrest further includes a first recessed headphone indentation disposed in the first side surface of the main body portion. The first recessed headphone indentation is shaped and dimensioned to receive a first speaker housing of the headphones device. The vehicle headrest further includes a second recessed headphone indentation disposed in the second side of the main body portion. The second recessed headphone indentation is shaped and dimensioned to receive a second speaker housing of the headphones device.

According to an exemplary embodiment of the present invention, a vehicle entertainment system includes a headphones device and a vehicle headrest. The headphones device includes a first speaker disposed in a first speaker housing, a second speaker disposed in a second speaker housing, and a headband connecting the first speaker housing to the second speaker housing. The vehicle headrest includes a recessed channel shaped and dimensioned to receive the headband, the first speaker housing, and the second speaker housing.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1A:
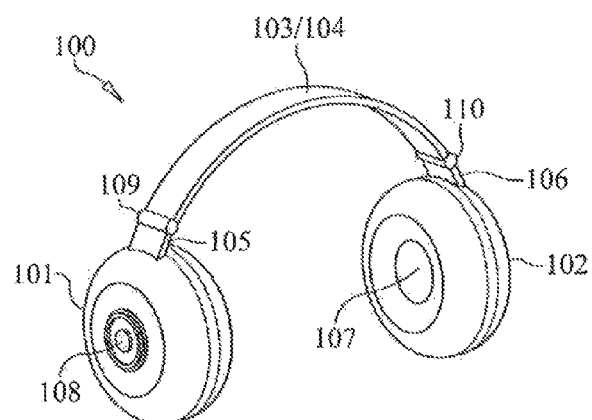
FIGS. 1A to 1C show a headphones device of a vehicle entertainment system according to exemplary embodiments of the present invention.

Exemplary embodiments of the present invention will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment. In addition, as used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art. For example, when one value is described as being about equal to another value, it is to be understood that the values are equal to each other to within a measurement error, or if measurably unequal, are close enough in value to be functionally equal to each other as would be understood by a person having ordinary skill in the art.

In addition, when two or more elements are described as being substantially flush with one another, it is to be understood that the elements are exactly flush with one another, or are almost flush with one another such that they appear to form the same plane. That is, it is to be understood that the elements are substantially even or level with one another within a measurement error. For example, when a headphones device is described as being substantially flush with a vehicle headrest, it is to be understood that the outer surface of the headphones device and the outer surface of the vehicle headrest are aligned with each other such that neither surface protrudes beyond the other surface. For example, when viewed from a profile, the headphones device does not visually protrude beyond the vehicle headrest.

According to exemplary embodiments of the present invention, a vehicle entertainment system includes a headphones device and a vehicle headrest into which the headphones device is docked. The headphones device may function as a typical headphones device, but may be specifically designed to be docked in the vehicle headrest.

Figure 1B:
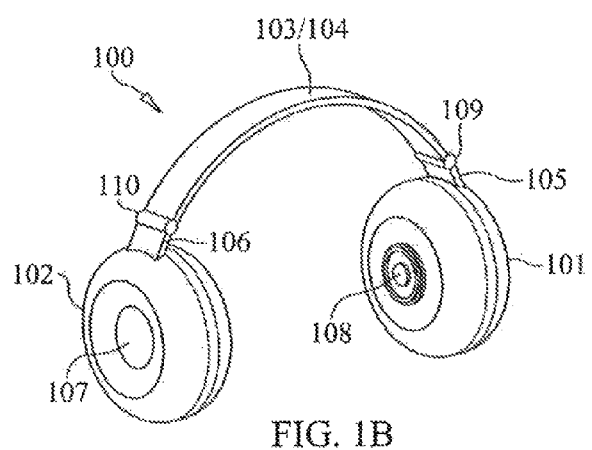
Figure 1C:
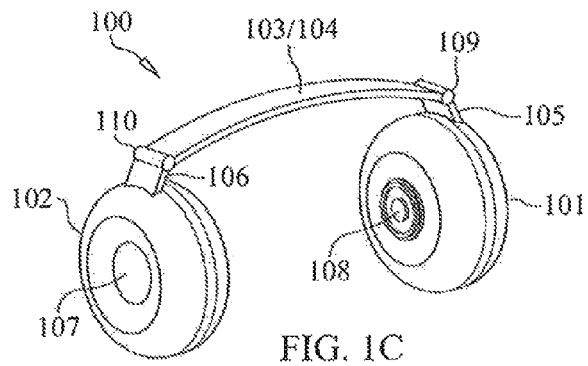
Figure 2A:
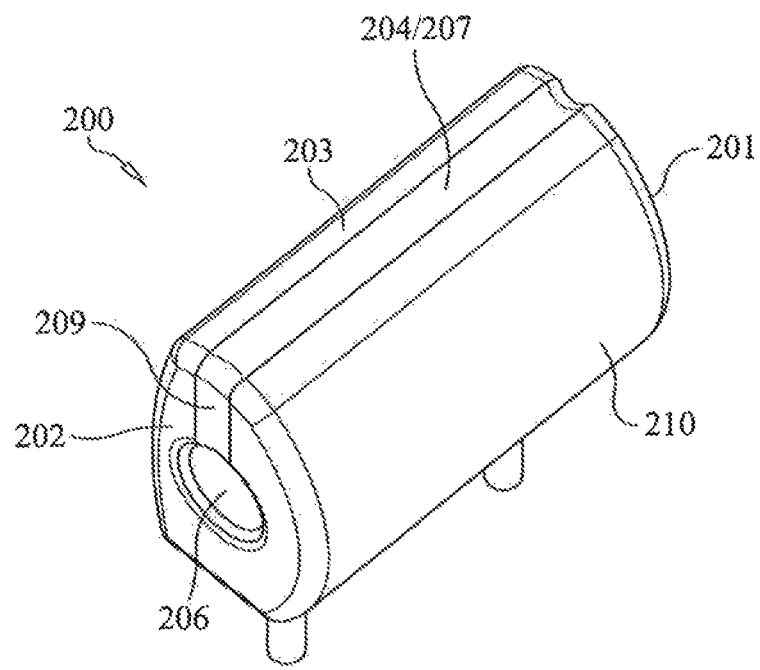
FIGS. 2A to 2D show a vehicle headrest of a vehicle entertainment system according to exemplary embodiments of the present invention.
Figure 2B:
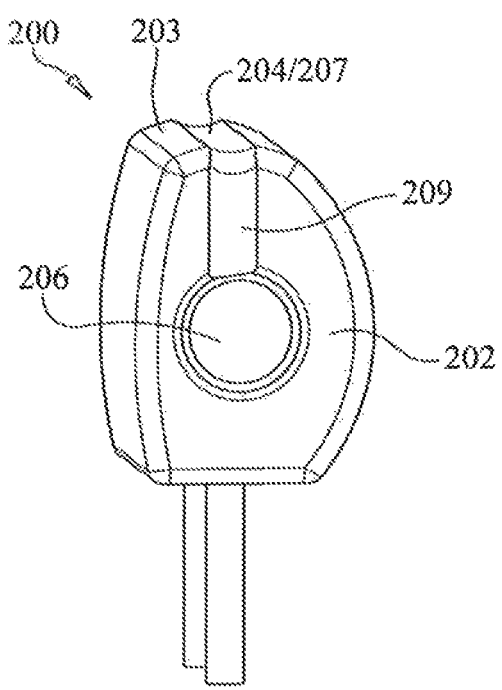
Figure 2C:
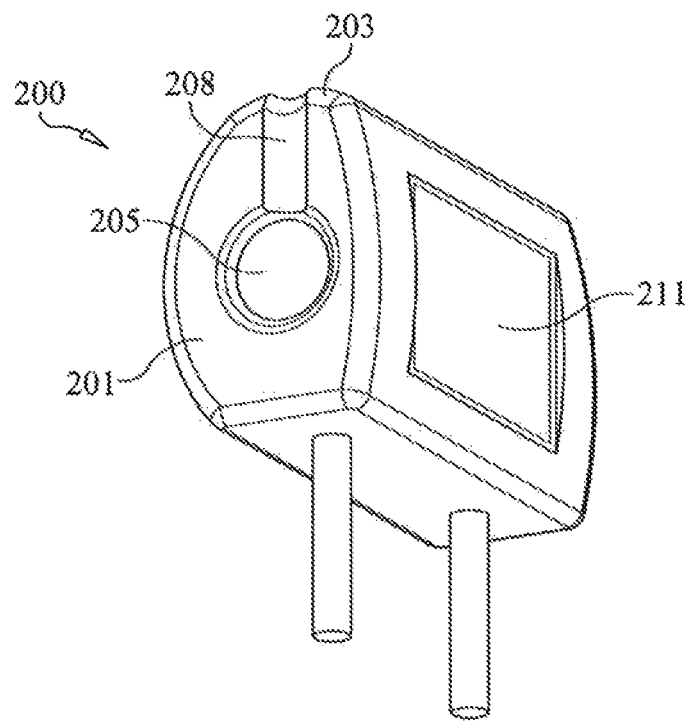
Figure 2D:
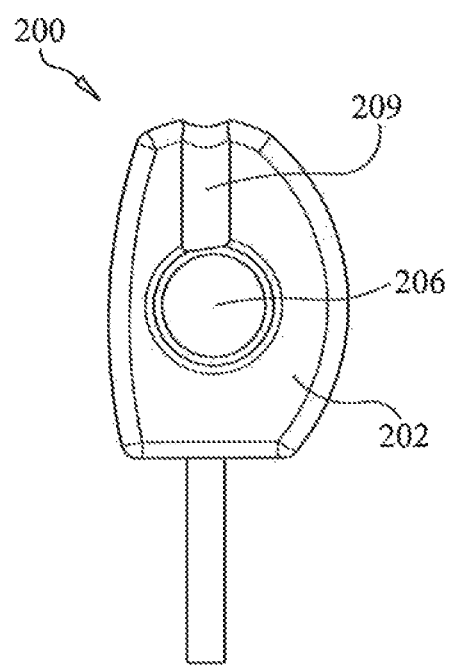

FIGS. 1A to 1C show a headphones device of a vehicle entertainment system according to exemplary embodiments of the present invention. FIGS. 2A to 2D show a vehicle headrest of a vehicle entertainment system according to exemplary embodiments of the present invention.

As shown in FIGS. 1A to 1C, a headphones device 100 according to exemplary embodiments of the present invention may include a first speaker disposed in a first speaker housing 101, a second speaker disposed in a second speaker housing 102, and a headband 103 connecting the first speaker housing 101 to the second speaker housing 102.

As shown in FIGS. 2A to 2D, a vehicle headrest 200 is shaped and dimensioned to receive the headphones device 100. For example, in an exemplary embodiment, the vehicle headrest 200 includes a main body portion 210 having a first side surface 201, a second side surface 202, and an upper surface 203. The upper surface 203 extends from a first end of the first side surface 201 to a first end of the second side surface 202. A recessed channel 204 is disposed in the upper surface 203, the first side surface 201, and the second side 202 surface of the main body portion 210. The recessed channel 204 is shaped and dimensioned to receive the headband 103 of the headphones device 100. The vehicle headrest 200 further includes a first recessed headphone indentation 205 disposed in the first side surface 201 of the main body portion 210, and a second recessed headphone indentation 206 is disposed in the second side 202 of the main body portion 210. The first recessed headphone indentation 205 is shaped and dimensioned to receive the first speaker housing 201 of the headphones device 100, and the second recessed headphone indentation 206 is shaped and dimensioned to receive the second speaker housing 102 of the headphones device 100.

In an exemplary embodiment, the thickness of the headband 103 of the headphones device 100 is about equal to the depth of the recessed channel 204 of the vehicle headrest 200, the thickness of the first speaker housing 101 is about equal to the depth of the first recessed headphone indentation 205 of the vehicle headrest 200, and the thickness of the second speaker housing 102 is about equal to the depth of the second recessed headphone indentation 206 of the vehicle headrest 200. As a result, when the headphones device 100 is docked in the vehicle headrest 200, the headphones device 100 is substantially flush with the vehicle headrest 200. For example, the outer surface of the headband 103 is substantially flush with the outer surface of the main body portion 210 while the headband 103 is inserted into the recessed channel 204, the outer surface of the first speaker housing 101 is substantially flush with the outer surface of the main body portion 210 while the first speaker housing 101 is inserted into the first recessed headphone indentation 205, and the outer surface of the second speaker housing 102 is substantially flush with the outer surface of the main body portion 210 while the second speaker housing 102 is inserted into the second recessed headphone indentation 206.

According to exemplary embodiments, the headband 103 may be made of a flexible material (e.g., a flexible plastic), allowing the headband 103 to flex between different positions such as when the headphones device 100 is worn by a user, and when the headphones device 100 is docked in the vehicle headrest 200. For example, in an exemplary embodiment, the shape of the headband 103 may conform to the shape of the recessed channel 204 in the vehicle headrest 200 when no flex is applied to the headphones device 100, and when worn by a user, the headband 103 may flex such that its shape conforms to the shape of the user's head.

The recessed channel 204 includes a first channel portion 207 disposed in the upper surface 203 of the main body portion 210, a second channel portion 208 disposed in the first side surface 201 of the main body portion 210, and a third channel portion 209 disposed in the second side surface 202 of the main body portion 210. As shown in FIGS. 2A to 2D, the second channel portion 208 and the third channel portion 209 respectively extend onto the first side surface 201 and the second side surface 202 from the first channel portion 207. That is, the first channel portion 207, the second channel portion 208, and the third channel portion 209 are connected to one another.

Referring again to FIGS. 1A to 1C, the headband 103 of the headphones device 100 includes an upper portion 104, a first side portion 105 having a first end connected to a first end of the upper portion 104 and a second end connected to the first speaker housing 101, and a second side portion 106 having a first end connected to a second end of the upper portion 104 and a second end connected to the second speaker housing 102.

According to exemplary embodiments of the present invention, the length of the upper portion 104 of the headband 103 is adjustable. For example, the length of the upper portion 104 may be adjustable in a direction that results in the first speaker housing 101 and the second speaker housing 102 moving closer to and further from one another. This allows the headphones device 100 to be adjusted to be in a docking position, in which the distance between the first speaker housing 101 and the second speaker housing 102 corresponds to the length of the vehicle headrest 200 between the first side 201 and the second side 202, allowing the headphones device 100 to be docked in the vehicle headrest 200. FIG. 1B shows the headband 103 of the headphones device 100 adjusted to be in a first position in which the headphones device 100 is worn by a user, and FIG. 1C shows the headband 103 of the headphones device 100 adjusted to be in a second position in which the length of the headband 103 is increased such that the headphones device 100 is in the docking position.

For example, in an exemplary embodiment, the width of the upper portion 104 of the headband 103 is about equal to the width of the first channel portion 207 of the vehicle headrest 200, and the thickness of the upper portion 104 of the headband 103 is about equal to the depth of the first channel portion 207. In addition, when the length of the headband 103 is adjusted such that the headphones device 100 is in the docking position, the length of the upper portion 104 of the headband 103 is about equal to the length of the first channel portion 207, the length of the first side portion 105 of the headband 103 is about equal to the length of the second channel portion 208, the width of the first side portion 105 is about equal to the width of the second channel portion 208, and the thickness of the first side portion 105 is about equal to the depth of the second channel portion 208. In addition, the length of the second side portion 106 of the headband 103 is about equal to the length of the third channel portion 209, the width of the second side portion 106 is about equal to the width of the third channel portion 209, and the thickness of the second side portion 106 is about equal to the depth of the third channel portion 209.

According to exemplary embodiments of the present invention, the periphery of the first recessed headphone indentation 205 in the vehicle headrest 200 is about equal to the periphery of the first speaker housing 101 of the headphones device 100, and the depth of the first recessed headphone indentation 205 is about equal to the thickness of the first speaker housing 101. Similarly, the periphery of the second recessed headphone indentation 206 is about equal to the periphery of the second speaker housing 102, and the depth of the second recessed headphone indentation 206 is about equal to the thickness of the second speaker housing 102.

Figure 3A:
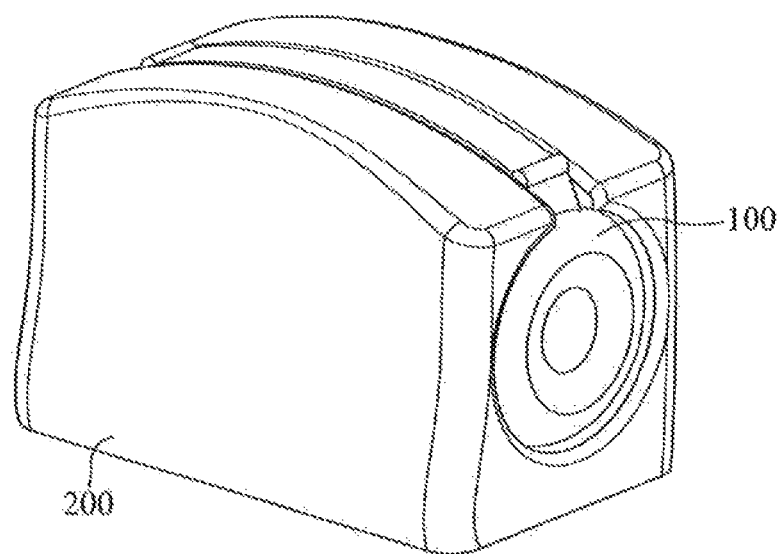
FIGS. 3A to 3C show a vehicle entertainment system including a headphones device and a vehicle headrest according to exemplary embodiments of the present invention.
Figure 3B:
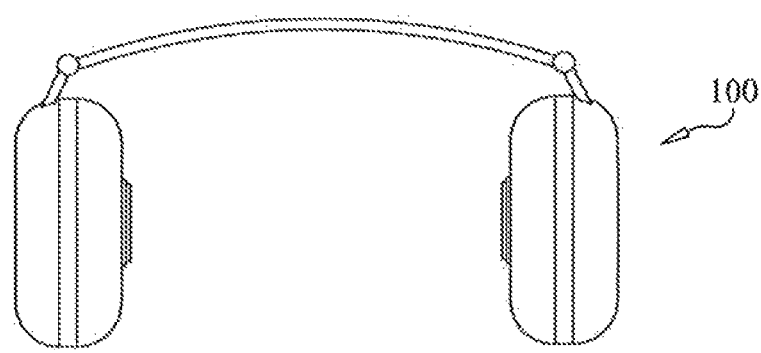
Figure 3B:
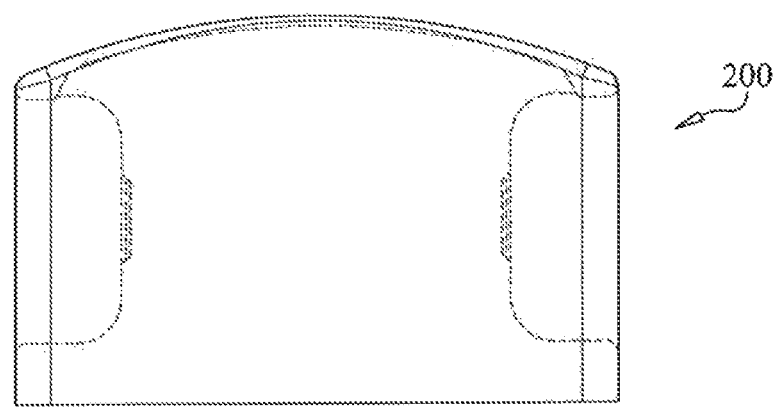
Figure 3C:
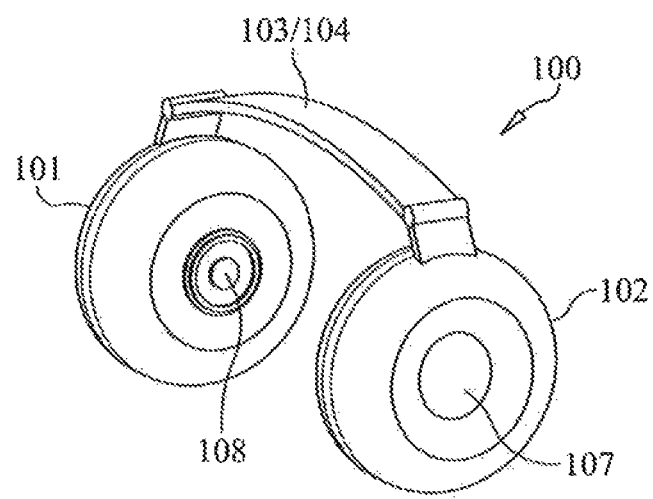
Figure 3C:
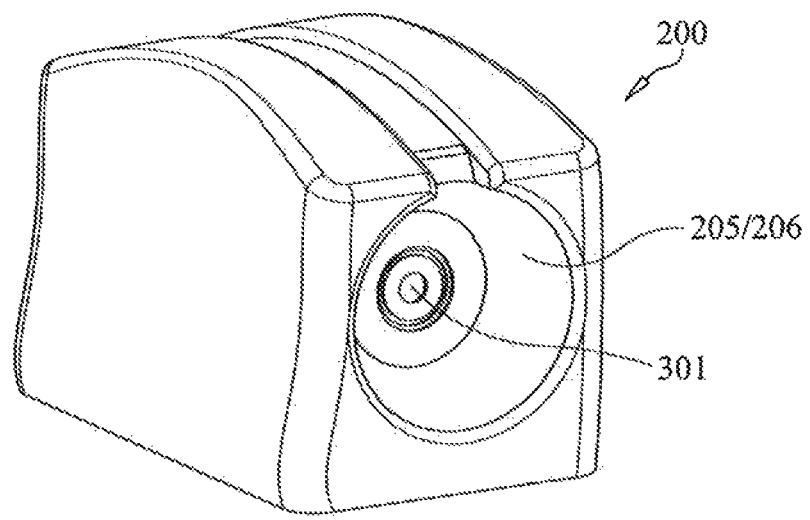

FIGS. 3A to 3C show a vehicle entertainment system including the headphones device and the vehicle headrest according to exemplary embodiments of the present invention.

As shown in FIGS. 3A to 3C, as a result of the above-described configuration of the headphones device 100 and the vehicle headrest 200, in exemplary embodiments, when docked, the outer surfaces of the headphones device 100 are substantially flush with the outer surfaces of the vehicle headrest 100. As a result, exemplary embodiments of the present invention provide a sleek and aesthetically pleasing vehicle entertainment system in which, when docked, the headphones device 100 fits within the vehicle headrest 200 such that it visually appears to be part of the interior trim of the vehicle. For example, when docked in the vehicle headrest 200, the headphones device 100 may not draw excessive attention from passengers in the vehicle, since the headphones device 100 does not protrude from the vehicle headrest 200, and appears to be part of the vehicle headrest 200.

According to exemplary embodiments of the present invention, the headphones device 100 is a wireless headphone device that includes an internal battery. In addition to providing a convenient and visually pleasing location in which the headphones device 100 can be mounted when not in use, the vehicle headrest 200 may also facilitate charging of the internal battery in the headphones device 100 when the headphones device 100 is docked.

Figure 5:
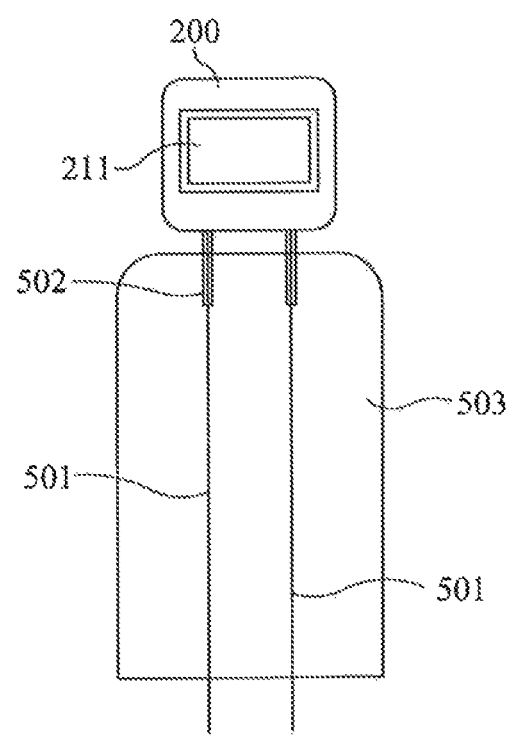
FIG. 5 shows a vehicle headrest of a vehicle entertainment system according to exemplary embodiments of the present invention.

For example, the vehicle headrest 200 may be electrically connected to a power source of the vehicle (see, for example, FIG. 5). The headphones device 100 may be charged via the vehicle headrest 200 in a variety of ways.

For example, in an exemplary embodiment, wireless charging may be utilized to charge the headphones device 100. In such an embodiment, the vehicle headrest 200 may include an inductive transmitter charging coil disposed in the main body 210 and connected to the vehicle's power source, and the headphones device 100 may include an inductive receiver charging coil disposed therein and connected to the internal batter of the headphones device 100.

The inductive receiver charging coil may be disposed in at least one of the first speaker housing 101 and the second speaker housing 102 of the headphones device 100, and the inductive transmitter charging coil may be disposed in the main body 210 of the vehicle headrest 200 in an area corresponding to at least one of the first recessed headphone indentation 205 and the second recessed headphone indentation 206. When the headphones device 100 is docked in the vehicle headrest 200, the inductive transmitter charging coil and the inductive receiver charging coil are placed in close proximity to each other, and the internal battery may be wirelessly charged via inductive charging facilitated by the coils. That is, the internal battery may be wireless charged via the inductive transmitter charging coil and the inductive receiver charging coil in response to the headphones device 100 being inserted into the recessed channel 204, the first recessed headphone indentation 205, and the second recessed headphone indentation 206 of the vehicle headrest 200.

The internal battery may be wirelessly charged via the inductive transmitter charging coil and the inductive receiver charging coil using a variety of wireless charging standards such as, for example, the QI standard or the POWER MATTERS ALLIANCE (PMA) standard. However, wireless charging is not limited thereto.

In an exemplary embodiment, instead of utilizing wireless charging facilitated by inductive coils, first electrical contacts may be disposed on the vehicle headrest 200, and corresponding second electrical contacts may be disposed on the headphones device 100. The first and second electrical contacts may be, for example, electrical contact pins that contact each other to facilitate charging of the internal battery of the headphones device 100 via the vehicle's power source. The first electrical contacts may be connected to the vehicle's power source and disposed in at least one of the first recessed headphone indentation 205 and the second recessed headphone indentation 206, and the second electrical contacts may be connected to the internal battery of the headphones device 100 and disposed on at least one of the first speaker housing 101 and the second speaker housing 102. When the headphones device 100 is docked in the vehicle headrest 200, the first electrical contacts make contact with and electrically connect to the second electrical contacts, and the internal battery of the headphones device 100 is charged via the vehicle headrest 200 in response to the first electrical contacts electrically connecting to the second electrical contacts.

Herein, the inductive charging coils and the electrical contacts described above may be referred to as charging components. In addition, the sides of the speaker housings 101 and 102 that face inward toward each other and contact the user's head/ears when worn by the user may be referred to as inner sides of the speaker housings 101 and 102, and the opposite sides of the speaker housings 101 and 102 that do not contact the user's head/ears when worn by the user may be referred to as outer sides of the speaker housings 101 and 102.

According to exemplary embodiments of the present invention, the charging components described above may be included on one or both of the first speaker housing 101 and the second speaker housing 102, and in one or both of the first recessed headphone indentation 205 and the second recessed headphone indentation 206.

According to exemplary embodiments of the present invention, the charging components described above may be disposed on an inner side of at least one of the speaker housings 101 and 102, and/or on an outer side of at least one of the speaker housings 101 and 102.

For example, in an exemplary embodiment, the speakers are disposed on or near the inner sides of the speaker housings 101 and 102 such that they provide sound through the inner sides of the speaker housings 101 and 102, and a charging component(s) is disposed on or near the inner sides of the speaker housing 101 and/or 102. When the headphones device 100 is not in use, the headphones device 100 may be docked in the vehicle headrest 200 with the inner sides facing each other, as when worn by the user, and the charging component(s) in the headphones device 100 electrically connect to the charging component(s) disposed in the vehicle headrest 100 to charge the headphones device 100.

In an exemplary embodiment, the speakers are disposed on or near the inner sides of the speaker housings 101 and 102 such that they provide sound through the inner sides of the speaker housings 101 and 102, and the charging component(s) is disposed on or near the outer sides of the speaker housing 101 and/or 102. For example, as shown in FIGS. 1A to 1C, in an exemplary embodiment, the speakers 107 are disposed on or near the inner sides of the speaker housings 101 and 102, and a charging component (e.g., an inductive coil or electrical contacts) 108 is disposed on or near the outer side of the speaker housing 101. The headphones device 100 may include a first hinge 109 connecting the upper portion 104 of the headband 103 to the first side portion 105 of the headband 103, and a second hinge 110 connecting the upper portion 104 of the headband 103 to the second side portion 106 of the headband 103. The first side portion 105 of the headband 103 may fold inward toward the upper portion 104 of the headband 103 and outward away from the upper portion 104 of the headband 103 via the first hinge 109. Similarly, the second side portion 106 of the headband 103 may fold inward toward the upper portion 104 of the headband 103 and outward away from the upper portion 104 of the headband 103 via the second hinge 110 (see FIG. 4C).

As shown in FIG. 1B, the headphones device 100 may be inverted via the first and second hinges 109 and 110, resulting in the outer sides of the speaker housings 101 and 102 facing inward toward each other, and the inner sides of the speaker housings 101 and 102 facing outward. This allows the outer side of the speaker housing 101, which includes the charging component 108, to contact the vehicle headrest 200 when docked. For example, the hinges 109 and 110 may be pivoted about 180 degrees to transition the headphones device 100 between a listening position in which the inner sides of the speaker housings 101 and 102 including the speakers 107 face inward toward each other, and a docking position in which the outer sides of the speaker housings 101 and 102, at least one of which includes the charging component 108, face inward toward each other. As a result, when in the docking position, the headphones device 100 may be docked into the vehicle headrest 200 such that the charging component 108 disposed on the headphones device electrically connects to the charging component 301 disposed on the vehicle headrest (e.g., within a recessed headphone indentation 205/206) (see FIG. 3C).

According to exemplary embodiments, each of the headphones device 100 and the vehicle headrest 200 may include the inductive charging coils and the electrical contacts described above, allowing for multiple methods of charging the headphones device 100.

As shown in FIGS. 3A to 3C, the headphones device 100 is shaped and dimensioned to be docked in the recessed channel 204 of the vehicle headrest 200 such that the headphones device 100 is substantially flush with the vehicle headrest 200 when docked. This design provides a convenient and aesthetically pleasing way to store the headphones device 100 when not in use, resulting in the internal battery of the headphones device 100 maintaining its charge, and reducing the risk of the headphones device 100 being lost when not in use in the vehicle.

Figure 4A:
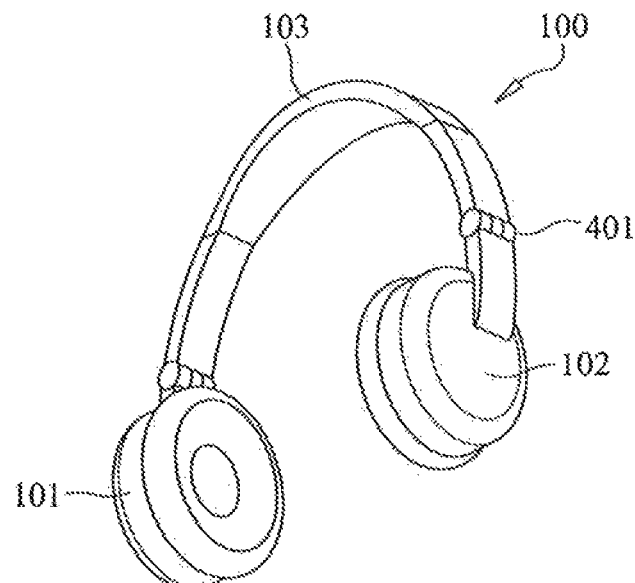
FIGS. 4A to 4C show a headphones device of a vehicle entertainment system according to exemplary embodiments of the present invention.
Figure 4B:
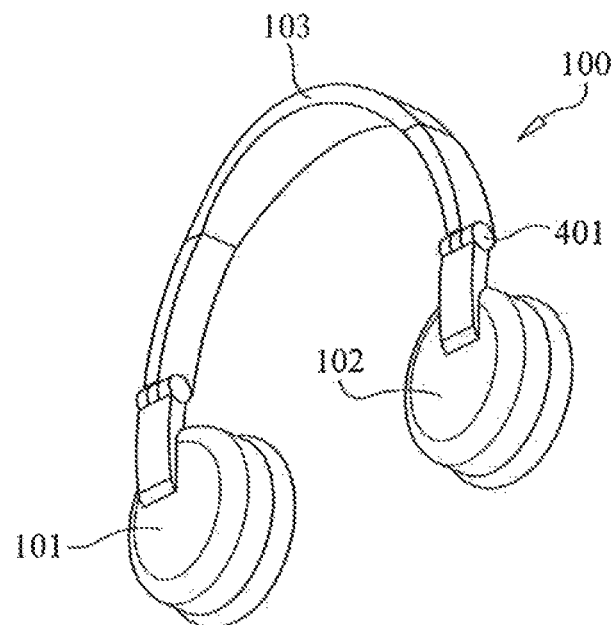
Figure 4C:
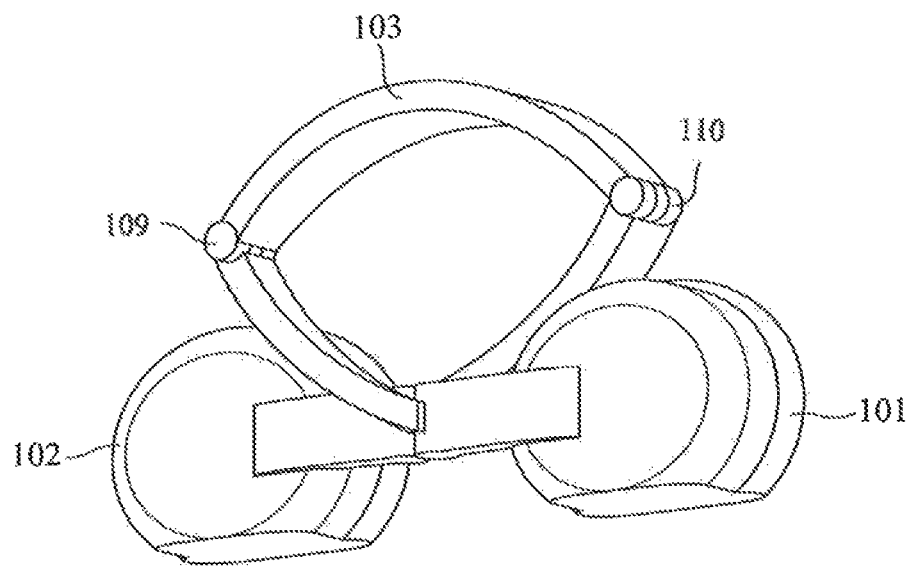

FIGS. 4A to 4C show a headphones device of a vehicle entertainment system according to exemplary embodiments of the present invention.

According to exemplary embodiments of the present invention, the headphones device 100 includes rotatable hinges 401 respectively connecting the first and second speaker housings 101 and 102 to the headband 103, allowing the headphones device 100 to transition between the positions illustrated in FIGS. 4A and 4B. For example, the rotatable hinges 401 allow the first and second speaker housings 101 and 102 to rotate relative to the headband 103 from the position shown in FIG. 4A to the position shown in FIG. 4B. Thus, the first and second speaker housings 101 and 102 may be folded flat, as shown in FIG. 4B. Referring to FIG. 4C, in an exemplary embodiment, the first and second speaker housings 101 and 102 may further fold inward via the first and second hinges 109 and 110, respectively, as described above.

Figure 4D:
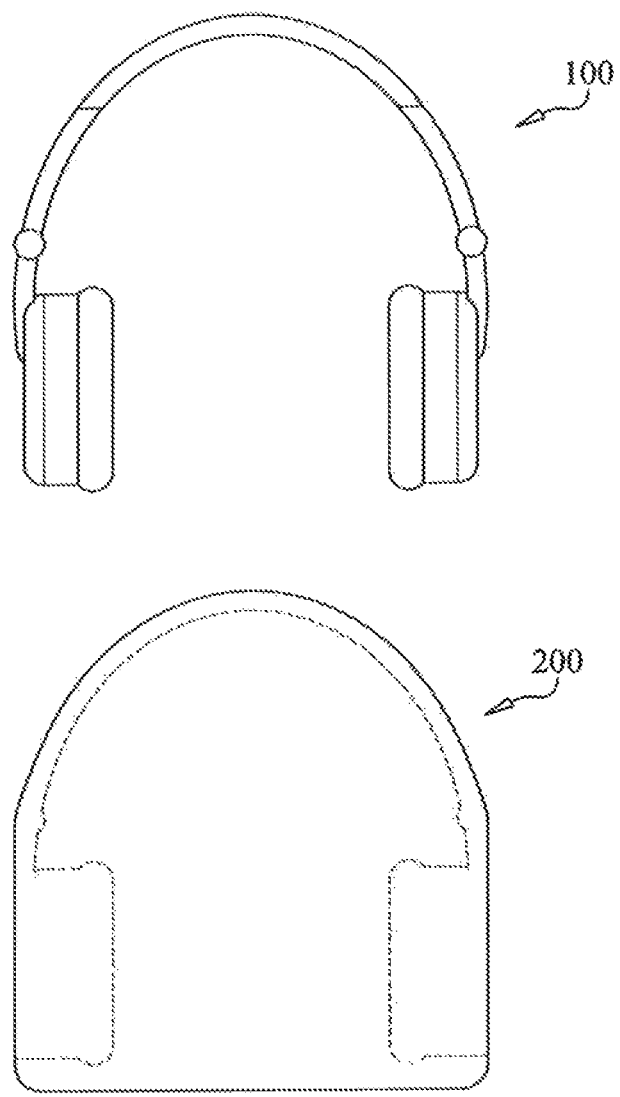
FIGS. 4D to 4F show a vehicle entertainment system including a headphones device and a vehicle headrest according to exemplary embodiments of the present invention.
Figure 4E:
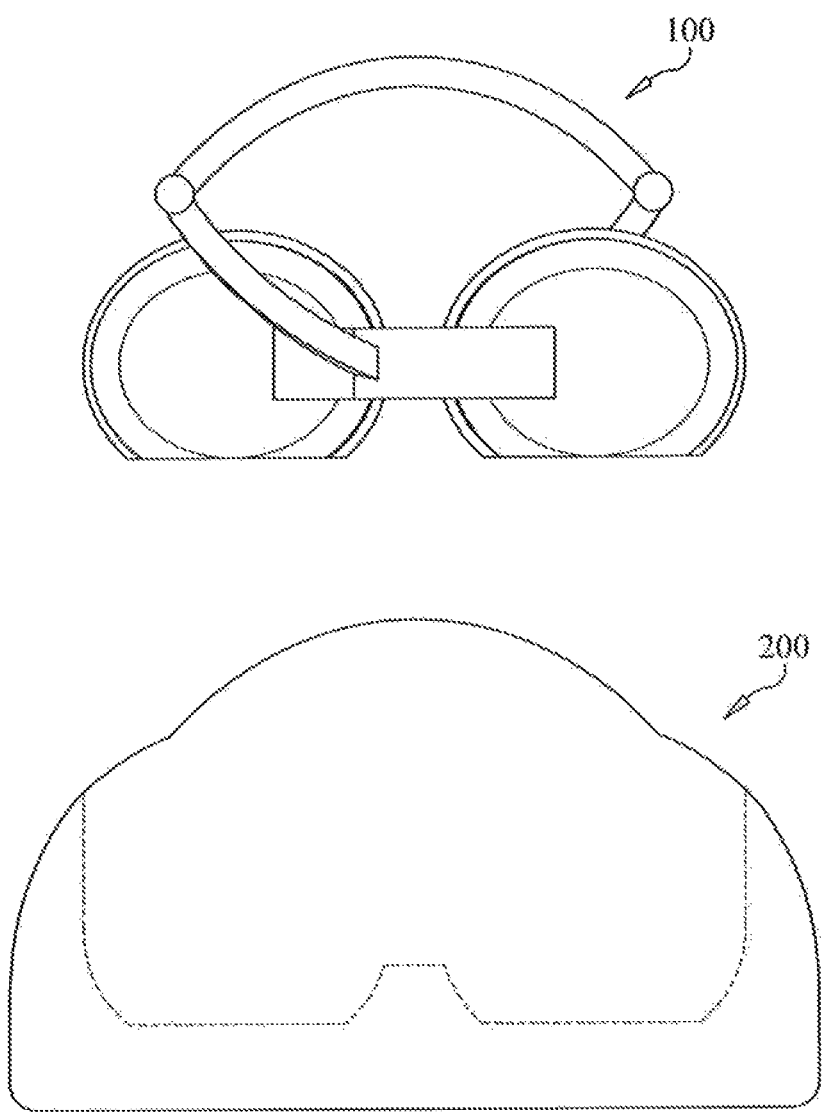
Figure 4F:
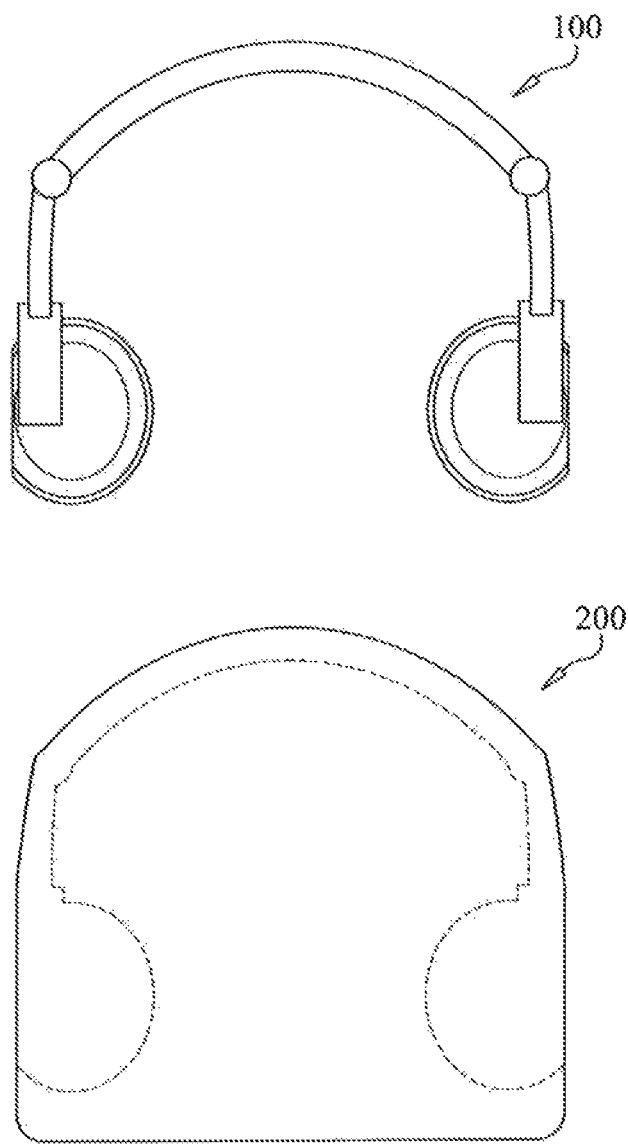

FIGS. 4D to 4F show a vehicle entertainment system including a headphones device and a vehicle headrest according to exemplary embodiments of the present invention.

As shown in FIGS. 4D to 4F, according to exemplary embodiments, the vehicle headrest 200 may be shaped and dimensioned to receive the headphones device 100 while the headphones device 100 is in a variety of configurations. For example, as shown in FIG. 4D, in an exemplary embodiment, the headphones device 100 may be docked in the vehicle headrest 200 while the headphones device 100 is in a standard (e.g., unfolded) position. As shown in FIG. 4E, in an exemplary embodiment, the headphones device 100 may be docked in the vehicle headrest 200 while the headphones device 100 is in a position in which the first and second speaker housings 101 and 102 are folded flat via the rotatable hinges 401 (as described above with reference to FIGS. 4A and 4B), and in which the first and second speaker housings 101 and 102 are folded inward via the first and second hinges 109 and 110 (as described above with reference to FIG. 4C). As shown in FIG. 4F, in an exemplary embodiment, the headphones device 100 may be docked in the vehicle headrest 200 while the headphones device 100 is in a position in which the first and second speaker housings 101 and 102 are folded flat via the rotatable hinges 401 (as described above with reference to FIGS. 4A and 4B).

In each of the configurations shown in FIGS. 4D to 4F, the headphones device 100 is substantially flush with the vehicle headrest 200 when the headphones device 100 is docked in the vehicle headrest 200. For example, when docked, the outer surface of the headband 103 is substantially flush with the outer surface of the vehicle headrest 200, the outer surface of the first speaker housing 101 is substantially flush with the outer surface of the vehicle headrest 200, and the outer surface of the second speaker housing 102 is substantially flush with the outer surface of the vehicle headrest 200. In exemplary embodiments, a portion (e.g., an outer side) of each speaker housing 101 and 102 is substantially flat, as shown in FIGS. 4C, 4E and 4F. Referring to FIG. 4F, the substantially flat portion of the speaker housings 101 and 102 allow the headphones device 100 to be substantially flush with the vehicle headrest 200 when docked in the folded position.

FIG. 5 shows a vehicle headrest of a vehicle entertainment system according to exemplary embodiments of the present invention.

As described above, the vehicle headrest 200 may be electrically connected to a power source of the vehicle. A power wire(s) 501 connecting the vehicle headrest 200 to the power source may pass through the corresponding headrest post 502 and seat 503. The power wire(s) 501 may pass through a single headrest post 502 or multiple headrest posts 502.

According to exemplary embodiments of the present invention, the vehicle headrest 200 includes a display screen 211 disposed on a rear surface of the main body portion 210 for presenting video content to a user. The vehicle headrest 200 may further include, for example, a speaker for providing audio content, and a wireless transceiver(s) (e.g., an infrared (IR) transceiver, a BLUETOOTH transceiver, a Wi-Fi transceiver, a cellular transceiver, etc.) that wirelessly provides audio content to the headphones device 100 and that optionally receives media content wirelessly from a remote video source. The vehicle headrest 200 may include a variety of media sources and interfaces allowing for media input including, for example, an optical disc player (e.g., a DVD and/or CD-ROM player), a portable storage device interface(s) (e.g., a memory card slot such as an SD card slot, a microSD card slot, etc., a USB interface, a microUSB interface, an APPLE LIGHTNING interface, etc.), an HDMI interface, etc.

Figure 6A:
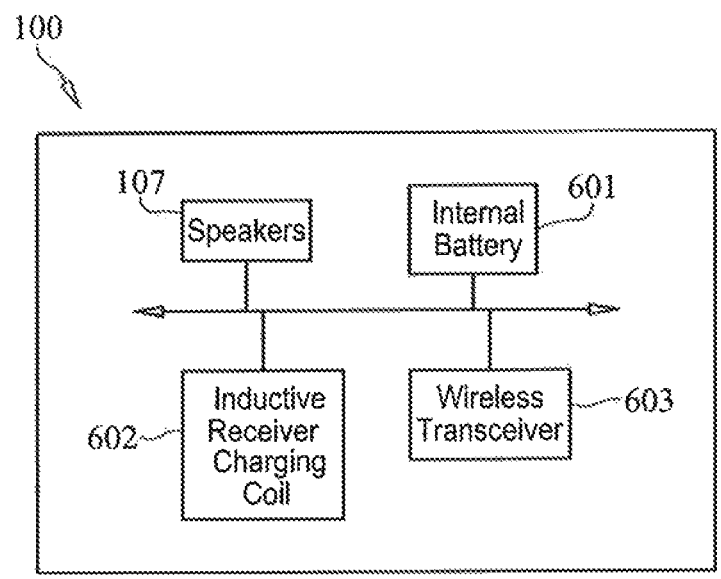
FIGS. 6A and 6B are block diagrams showing components included in a headphones device and a vehicle headrest according to exemplary embodiments of the present invention.
Figure 6B:
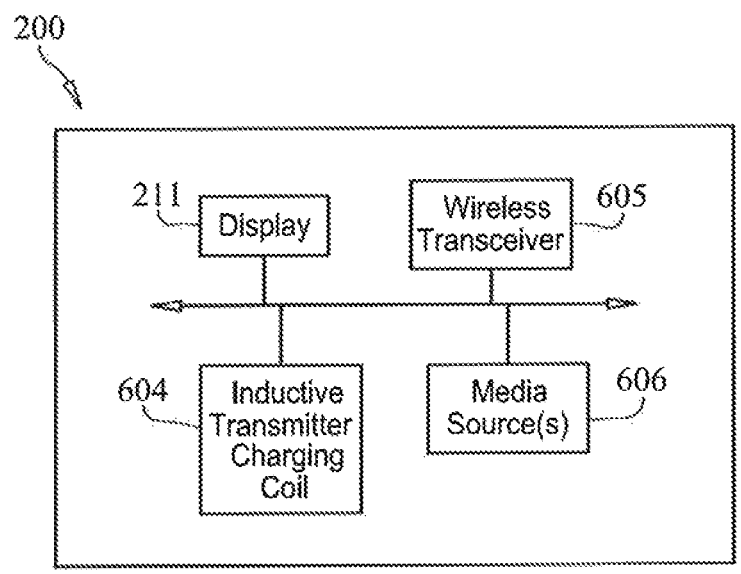

FIGS. 6A and 6B are block diagrams showing components included in a headphones device and a vehicle headrest according to exemplary embodiments of the present invention.

As shown in FIG. 6A, in an exemplary embodiment, the headphones device 100 includes speakers 107, an internal battery 601 that supplies power to the headphones device 100, an inductive receiver charging coil 602 that charges the internal battery 601, and a wireless transceiver 603 that receives wireless signals (e.g., an audio stream) from the vehicle headrest 200. As shown in FIG. 6B, in an exemplary embodiment, the vehicle headrest 200 includes the display 211, an inductive transmitter charging coil 604 that charges the internal battery 601, a wireless transceiver 605 that transmits wireless signals (e.g., an audio stream) to the headphones device 100, and a media source(s) 606 as described above.

Having described exemplary embodiments for a vehicle entertainment system, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A vehicle entertainment system, comprising:
a headphones device, wherein the headphones device comprises:
a first speaker disposed in a first speaker housing;
a second speaker disposed in a second speaker housing;
a headband;
a first rotatable hinge connecting the first speaker housing to the headband; and
a second rotatable hinge connecting the second speaker housing to the headband, wherein the first and second sneaker housings are configure to be folded flat via the first and second rotatable hinges; and
a vehicle headrest, wherein the vehicle headrest comprises:
a main body portion having a first side surface, a second side surface, and an upper surface extending from a first end of the first side surface to a first end of the second side surface;
a recessed channel disposed in the upper surface, the first side surface, and the second side surface of the main body portion, wherein the recessed channel is shaped and dimensioned to receive the headband of the headphones device;
a first recessed headphone indentation disposed in the first side surface of the main body portion, wherein the first recessed headphone indentation is shaped and dimensioned to receive the first speaker housing while the first speaker housing is folded flat via the first rotatable hinge; and
a second recessed headphone indentation disposed in the second side of the main body portion, wherein the second recessed headphone indentation is shaped and dimensioned to receive the second speaker housing while the second speaker housing is folded flat via the second rotatable hinge.

2. The vehicle entertainment system of claim 1, further comprising a display disposed on a rear surface of the main body portion.

3. The vehicle entertainment system of claim 1,
wherein a thickness of the headband of the headphones device is about equal to a depth of the recessed channel of the vehicle headrest,
wherein a thickness of the first speaker housing is about equal to a depth of the first recessed headphone indentation of the vehicle headrest,
wherein a thickness of the second speaker housing is about equal to a depth of the second recessed headphone indentation of the vehicle headrest.

4. The vehicle entertainment system of claim 1,
wherein an outer surface of the headband is substantially flush with an outer surface of the main body portion while the headband is inserted into the recessed channel,
wherein an outer surface of the first speaker housing is substantially flush with the outer surface of the main body portion while the first speaker housing is inserted into the first recessed headphone indentation,
wherein an outer surface of the second speaker housing is substantially flush with the outer surface of the main body portion while the second speaker housing is inserted into the second recessed headphone indentation.

5. The vehicle entertainment system of claim 1,
wherein the headband comprises an upper portion, a first side portion having a first end connected to a first end of the upper portion and a second end connected to the first speaker housing, and a second side portion having a first end connected to a second end of the upper portion and a second end connected to the second speaker housing.

6. The vehicle entertainment system of claim 5, wherein a length of the upper portion of the headband is adjustable.

7. The vehicle entertainment system of claim 6,
wherein the recessed channel comprises a first channel portion disposed in the upper surface of the main body portion, a second channel portion disposed in the first side surface of the main body portion, and a third channel portion disposed in the second side surface of the main body portion,
wherein the first channel portion, the second channel portion, and the third channel portion are connected to one another.

8. The vehicle entertainment system of claim 7,
wherein a length of the first channel portion is about equal to a length of the upper portion of the headband while the upper portion is adjusted to be in a docking position, a width of the first channel portion is about equal to a width of the upper portion of the headband, and a depth of the first channel portion is about equal to a thickness of the upper portion of the headband,
wherein a length of the second channel portion is about equal to a length of the first side portion of the headband, a width of the second channel portion is about equal to a width of the first side portion of the headband, and a depth of the second channel portion is about equal to a thickness of the first side portion of the headband, wherein a length of the third channel portion is about equal to a length of the second side portion of the headband, a width of the third channel portion is about equal to a width of the second side portion of the headband, and a depth of the third channel portion is about equal to a thickness of the second side portion of the headband.

9. The vehicle entertainment system of claim 8, wherein a periphery of the first recessed headphone indentation is about equal to a periphery of the first speaker housing, and a depth of the first recessed headphone indentation is about equal to a thickness of the first speaker housing, wherein a periphery of the second recessed headphone indentation is about equal to a periphery of the second speaker housing, and a depth of the second recessed headphone indentation is about equal to a thickness of the second speaker housing.

10. The vehicle entertainment system of claim 1, wherein the vehicle headrest is configured to electrically connect to a power source of a vehicle, and further comprises first electrical contacts disposed in the first recessed headphone indentation, wherein the headphones device further comprises an internal battery and second electrical contacts disposed on the first speaker housing, wherein the first electrical contacts make contact with and electrically connect to the second electrical contacts while the first speaker housing is inserted into the first recessed headphone indentation, and the internal battery is charged via the vehicle headrest in response to the first electrical contacts electrically connecting to the second electrical contacts.

11. The vehicle entertainment system of claim 1, wherein the vehicle headrest is configured to electrically connect to a power source of a vehicle, and further comprises an inductive transmitter charging coil disposed in the main body, wherein the headphones device further comprises an internal battery and an inductive receiver charging coil, wherein the internal battery is wirelessly charged via the inductive transmitter charging coil and the inductive receiver charging coil in response to the headphones device being inserted into the recessed channel, the first recessed headphone indentation, and the second recessed headphone indentation of the vehicle headrest.

12. The vehicle entertainment system of claim 11, wherein the inductive transmitter charging coil is disposed within the main body in an area corresponding to the first recessed headphone indentation, and the inductive receiver charging coil is disposed within the first speaker housing.

13. The vehicle entertainment system of claim 11, wherein the internal battery is wirelessly charged via the inductive transmitter charging coil and the inductive receiver charging coil using a QI standard or a POWER MATTERS ALLIANCE (PMA) standard.

14. The vehicle entertainment system of claim 1, wherein the first speaker housing comprises a first substantially flat portion, and the first substantially flat portion faces outward from the first side surface of the main body portion while the first speaker housing is folded flat and disposed in the first recessed headphone indentation, wherein the second speaker housing comprises a second substantially flat portion, and the second substantially flat portion faces outward from the second side surface of the main body portion while the second speaker housing is folded flat and disposed in the second recessed headphone indentation.

15. The vehicle entertainment system of claim 14, wherein the first substantially flat portion is substantially flush with the first side surface of the main body portion while the first speaker housing is disposed in the first recessed headphone indentation, wherein the second substantially flat portion is substantially flush with the second side surface of the main body portion while the second speaker housing is disposed in the second recessed headphone indentation.

16. A vehicle entertainment system, comprising:

a headphones device, wherein the headphones device comprises:

a first speaker disposed in a first speaker housing;

a second speaker disposed in a second speaker housing; and a headband connecting the first speaker housing to the second speaker housing; and a vehicle headrest, wherein the vehicle headrest comprises:

a main body portion having a first side surface, a second side surface, and an upper surface extending from a first end of the first side surface to a first end of the second side surface;

a recessed channel disposed in the upper surface, the first side surface, and the second side surface of the main body portion, wherein the recessed channel is shaped and dimensioned to receive the headband of the headphones device;

a first recessed headphone indentation disposed in the first side surface of the main body portion, wherein the first recessed headphone indentation is shaped and dimensioned to receive the first speaker housing; and a second recessed headphone indentation disposed in the second side of the main body portion, wherein the second recessed headphone indentation is shaped and dimensioned to receive the second speaker housing, wherein the vehicle headrest is configured to electrically connect to a power source of a vehicle, and further comprises an inductive transmitter charging coil disposed in the main body, wherein the headphones device further comprises an internal battery and an inductive receiver charging coil, wherein the internal battery is wirelessly charged via the inductive transmitter charging coil and the inductive receiver charging coil in response to the headphones device being inserted into the recessed channel, the first recessed headphone indentation, and the second recessed headphone indentation of the vehicle headrest.

17. The vehicle entertainment system of claim 16, wherein the inductive transmitter charging coil is disposed within the main body in an area corresponding to the first recessed headphone indentation, and the inductive receiver charging coil is disposed within the first speaker housing.

18. The vehicle entertainment system of claim 16, wherein the internal battery is wirelessly charged via the inductive transmitter charging coil and the inductive receiver charging coil using a QI standard or a POWER MATTERS ALLIANCE (PMA) standard.

19. The vehicle entertainment system of claim 16, further comprising a display disposed on a rear surface of the main body portion.

20. The vehicle entertainment system of claim 16,
- wherein a thickness of the headband of the headphones device is about equal to a depth of the recessed channel of the vehicle headrest,
- wherein a thickness of the first speaker housing is about equal to a depth of the first recessed headphone indentation of the vehicle headrest,
- wherein a thickness of the second speaker housing is about equal to a depth of the second recessed headphone indentation of the vehicle headrest.

* * * * *